United States Patent [19]
Yu

[11] Patent Number: 5,256,460
[45] Date of Patent: Oct. 26, 1993

[54] POLYMERIC BLEND WITH HIGH RESISTANCE TO FUEL

[75] Inventor: Davei Yu, Merrimack, N.H.

[73] Assignee: SNIA Tecnopolimeri S.p.A., Ceriano Laghetto, Italy

[21] Appl. No.: 944,485

[22] Filed: Sep. 14, 1992

[51] Int. Cl.$^5$ .................... C08L 77/00; B65D 1/00
[52] U.S. Cl. .................... 428/36.9; 428/36.92; 525/66; 525/183
[58] Field of Search ............ 525/183, 66; 428/36.9, 428/36.92

[56] References Cited

U.S. PATENT DOCUMENTS

| | | | |
|---|---|---|---|
| 4,977,213 | 12/1990 | Groud-Abel et al. | 525/66 |
| 5,013,518 | 5/1991 | Nielinger et al. | 264/564 |
| 5,071,924 | 12/1991 | Koch et al. | 525/432 |

Primary Examiner—Ana L. Carrillo
Attorney, Agent, or Firm—Wolf, Greenfield & Sacks

[57] ABSTRACT

A polymeric blend and a fuel container made of this blend. The blend has improved resistance to fuel and includes:

(a) a copolymer obtained from copolymerization of ε-caprolactam, and a substance selected from the group consisting of:
   an aminocarboxylic acid having a carbon atom number not lower than 9,
   a lactam corresponding to said aminocarboxylic acid and
   a mixture of hexamethylenediamine with a dicarboxylic acid having a carbon atom number not lower than 9, a weight ratio of said ε-caprolactam with respect to said hexamethylenediamine plus said dicarboxylic acid being of from 4 to 9; and (b) a polyolefin polymer with functional groups selected from the group consisting of carboxyl groups, esters, anhydrides, and carboxylates.

25 Claims, No Drawings

POLYMERIC BLEND WITH HIGH RESISTANCE TO FUEL

FIELD OF THE INVENTION

The present invention relates to a new polymeric blend and to a fuel container and particularly a fuel hose made of this blend.

PRIOR ART

It is known that nylon 6 and nylon 6,6 cannot be reliably used to make fuel hoses and particularly gasoline hoses because these materials do not withstand dissolving action of $ZnCl_2$ or $CaCl_2$ as specified by major automotive industries. It was noted that the lower resistance occurs in the areas in which a hose is bent. In fact the bending causes a local higher mechanical stress which decreases the fuel resistance.

Nylon compounds with a higher carbon atom number, such as nylon 11 and nylon 12 have a better resistance, but they are much more expensive and above all are not flexible without plasticizers. However plasticizers cannot be used because they are extracted by gasoline which is a very good solvent of plasticizers.

Nylon 6,36 is much more flexible, but also this compound has about the same poor fuel resistance, of nylon 6.

It is also known that the blending of nylon 6 or nylon 6,6 with other polymeric compounds with the aim of improving flexibility or fuel resistance gives rise to blending problems since the blending compatibility of nylon 6 and nylon 6,6 is very poor.

SUMMARY OF THE INVENTION

According to the present invention, it is hereby surprisingly provided a blend having improved resistance to fuel, comprising:
(a) a copolymer obtainable from copolymerization of ε-caprolactam, and a substance selected from the group consisting of:
  an aminocarboxylic acid having a carbon atom number not lower than 9,
  a lactam corresponding to said aminocarboxylic acid and
  a mixture of hexamethylenediamine with a dicarboxylic acid having a carbon atom number not lower than 9;
(b) a polyolefin polymer with functional groups selected from the group consisting of carboxyl groups, esters, anhydrides and carboxylates.

Preferably a weight ratio of component (a) with respect to component (b) is of from 0.25 to 4 and more preferably said weight ratio is of from 0.65 to 2.5.

Preferably a weight ratio of said ε-caprolactam with respect to said hexamethylenediamine plus said dicarboxylic acid is of from 1.5 to 19 and more preferably said weight ratio is of from 4 to 9.

Preferably said carbon atom number is not lower than 10 and more preferably is 11 or 36.

Preferably said polyolefin polymer is selected from the group consisting of ethylene acrylic acid copolymer and ethylene acrylic acid ester copolymer.

Preferably said polyolefin polymer is from 0.1% to 20% with respect to the total weight of said blend.

Preferably said ethylene ethyl acrylate is from 5% to 15% with respect to the total weight of said blend.

Preferably said polyolefin polymer is anionomer, more preferably said ionomer is from 0.1% to 20% with respect to the total weight of said blend, still more preferably said ionomer is from 5% to 15% with respect to the total weight of said blend.

Preferably said polyolefin polymer is ethylene-propylene functionalized with maleic anhydride, more preferably said ethylene-propylene functionalized with maleic anhydride is from 0.1% to 30% with respect to the total weight of said blend, still more preferably said ethylene-propylene functionalized with maleic anhydride is from 5% to 25% with respect to the total weight of said blend.

Preferably the blend according to the invention comprises also nylon 6 in an amount of from 0.1% to 20% with respect to the total weight of said blend, more preferably said amount is of from 0.1% to 7%.

Preferably the blend according to the invention comprises also nylon 12 in an amount of from 0.1% to 40% with respect to the total weight of said blend, more preferably said amount is of from 0.1% to 25% acrylate.

Preferably said polyolefin polymer is ethylene ethyl acrylate.

DETAILED DESCRIPTION OF THE INVENTION

The following examples disclose the invention, but do not have any limitative effect. Parts are intended by weight, unless otherwise specified.

EXAMPLE 1

The copolymerization conditions for preparing the copolymer which forms component (a) of the blend according to the invention are the following with reference to a dicarboxylic acid having a carbon atom number of 36.

A stoichiometrically balanced solution of hexamethylene diamine and dimer acid in caprolactam is prepared; the weight ratio of hexamethylene diamine to caprolactam being 0.033. 0.47% by weight (based on caprolactam) of azelaic acid is added as molecular weight regulator. 2.0% of water is added.

The solution is copolymerized in a stirred, heated autoclave at atmospheric pressure with a nitrogen purge for 7 hours or until a melt temperature of 250° C. is reached.

Pressure is gradually reduced to 100 Torr absolute until the desired viscosity is reached. The preferred relative viscosity is in the range of from 2.5 to 3.5. Viscosity is determined through measurement of agitator speed and hydraulic pressure required to turn agitator.

EXAMPLE 2

The copolymerization conditions for preparing the copolymer which forms component (a) of the blend according to the invention are the following with reference to a dicarboxylic acid having a carbon atom number of 11.

A mixture of 1 part aminoundecanoic acid slurry in approximately 5.7 parts of molten caprolactam is prepared.

The mixture is copolymerized in a stirred, heated autoclave at atmospheric pressure with a nitrogen purge for 7 hours or until a melt temperature of 250° C. is reached.

Pressure is gradually reduced to 100 Torr absolute until the desired viscosity is reached. Viscosity is determined through measurement of agitator speed and hydraulic pressure required to turn agitator.

EXAMPLES 3-12

The blend according to the invention is prepared using an Essex single screw extruder with I.D. of 1.5 inch. The screw is a single stage screw with a ratio L/D of 24/1 and compression ratio) of 3.5/1. The screw speed is of from 10 to 35 rpm depending on the capability of the compounding equipment.

The screen packs are in sequence from small number of mesh to large number of mesh and particularly 60-120-240-120, etc. The type of extruder, compounding equipment and screw design is flexible, as long as the equipment produce good mixing product.

The temperature in the bopper, extruder and die is in the range of from 233° to 288° C. The preferred temperature in the hopper is 244° C. The preferred temperature of the blend at the outlet of the extruder is 266° C. The preferred temperature in the extruder is in the range of 255° to 266° C.

The compositions of examples 3-12 are reported in the table. Particularly the last two lines of the table report the time required for dissolving the final product in $ZnCl_2$ at respectively 23° and 700° C. The test with $ZnCl_2$ is important because is particularly reliable to assess the general resistance to fuel, since the behaviour of a polymer with $ZnCl_2$ is comparable with the behaviour of the same polymer with fuel.

| Examples | 3 | 4 | 5 | 6 | 7 | 8 | 9 | 10 | 11 | 12 |
|---|---|---|---|---|---|---|---|---|---|---|
| copolymer: ϵ-caprolactam, hexamethylenediamine, oleic acid dimer | 65 | 45 | 35 | — | — | — | 100 | — | — | — |
| copolymer: ϵ-caprolactam, amine-undecanoic acid | — | — | — | 65 | 45 | 35 | — | 100 | — | — |
| ethylene ethyl acrylate | 10 | 10 | 10 | 10 | 10 | 10 | — | — | — | — |
| ionomer | 10 | 10 | 10 | 10 | 10 | 10 | — | — | — | — |
| ethylene-propylene functionalized with maleic anhydride. | 10 | 20 | 15 | 10 | 20 | 15 | — | — | — | — |
| nylon 6 | 5 | 5 | 5 | 5 | 5 | 5 | — | — | 100 | — |
| nylon 12 | — | 10 | 25 | — | 10 | 25 | — | — | — | 100 |
| stab/additives | 0.2 | — | 0.2 | 0.2 | — | 0.2 | — | — | — | — |
| $ZnCl_2$ 23° C. | 1000 hr | 1000 hr | 1000 hr | 1000 hr | 1000 hr | 1000 hr | 25 min | 20 min | 5 min | 500 hr |
| $ZnCl_2$ 70° C. | 200 hr | 170 hr | 200 hr | 200 hr | 170 hr | 200 hr | NA | NA | NA | NA |

I claim:

1. A blend having improved resistance to fuel, comprising:
   (a) a copolymer obtained from copolymerization of ϵ-caprolactam, and a substance selected from the group consisting of:
      an aminocarboxylic acid having a carbon atom number not lower than 9,
      a lactam corresponding to said aminocarboxylic acid and
      a mixture of hexamethylenediamine with a dicarboxylic acid having a carbon atom number not lower than 9, a weight ratio of said ϵ-caprolactam with respect to said hexamethylenediamine plus said dicarboxylic acid being of from 4 to 9; and
   (b) a polyolefin polymer with functional groups selected from the group consisting of carboxyl groups, esters, anhydrides, and carboxylates.

2. A blend according to claim 1 in which a weight ratio of component (a) with respect to component (b) is of from 0.25 to 4.

3. A blend according to claim 1 in which a weight ratio of component (a) with respect to component (b) is of from 0.65 to 2.5.

4. A blend according to claim 1 in which a weight ratio of said ϵ-caprolactam with respect to said hexamethylenediamine plus said dicarboxylic acid is of from 1.5 to 19.

5. A blend according to claim 1 in which said carbon atom number of said dicarboxylic acid is 11.

6. A blend according to claim 1 in which said carbon atom number of said dicarboxylic acid is 36.

7. A blend according to claim 1 in which said polyolefin polymer is selected from the group consisting of ethylene acrylic acid copolymer and ethylene acrylic acid ester copolymer.

8. A blend according to claim 7 in which said polyolefin polymer is from 0.1% to 20% with respect to the total weight of said blend.

9. A blend according to claim 7 in which said ethylene acrylic acid ester copolymer is from 5% to 15% with respect to the total weight of said blend.

10. A blend according to claim 1 in which said polyolefin polymer is an ionomer.

11. A blend according to claim 10 in which said ionomer is from 0.1% to 20% with respect to the total weight of said blend.

12. A blend according to claim 10 in which said ionomer is from 5% to 15% with respect to the total weight of said blend.

13. A blend according to claim 1 in which said polyolefin polymer is ethylene-propylene copolymer functionalized with maleic anhydride.

14. A blend according to claim 13 in which ethylene-propylene copolymer functionalized with maleic anhydride is from 0.1% to 30% with respect to the total weight of said blend.

15. A blend according to claim 13 in which ethylene-propylene copolymer functionalized with maleic anhydride is from 5% to 25% with respect to the total weight of said blend.

16. A blend according to claim 1 comprising also nylon 6 in an amount of from 0.1% to 20% with respect to the total weight of said blend.

17. A blend according to claim 16 in which said amount is of from 0.1% to 7%.

18. A blend according to claim 1 comprising also nylon 12 in an amount of from 0.1% to 40% with respect to the total weight of said blend.

19. A blend according to claim 18 in which said amount is of from 0.1% to 25%.

20. A blend according to claim 1 wherein a carbon atom number of said dicarboxylic acid is not lower than 10.

21. A blend according to claim 7 in which said polyolefin polymer is ethylene ethyl acrylate copolymer.

22. A container made of a blend according to claim 1.

23. A fuel container made of a blend according to claim 1.

24. A hose made of a blend according to claim 1.

25. A fuel hose made of a blend according to claim 1.

* * * * *